United States Patent [19]
Parsons

[11] Patent Number: 5,709,127
[45] Date of Patent: Jan. 20, 1998

[54] MECHANICAL OSCILLATOR

[75] Inventor: John D. Parsons, Bethel, Conn.

[73] Assignee: Norco, Inc., Georgetown, Conn.

[21] Appl. No.: 680,642

[22] Filed: Jul. 17, 1996

Related U.S. Application Data

[63] Continuation of Ser. No. 333,735, Nov. 3, 1994, Pat. No. 5,592,852.

[51] Int. Cl.⁶ .............................. F16C 19/54; F16C 25/12
[52] U.S. Cl. .................. 74/57; 74/424.8 R; 74/459; 74/465; 384/454
[58] Field of Search ......................... 74/57, 58, 59, 74/424.8 R, 424.8 B, 465, 459; 384/454, 517

[56] References Cited

U.S. PATENT DOCUMENTS

| | | | |
|---|---|---|---|
| 3,648,535 | 3/1972 | Maroth | 74/459 X |
| 3,792,616 | 2/1974 | Wentzel | 74/57 |
| 4,008,625 | 2/1977 | Malhotra | 74/459 X |
| 4,145,166 | 3/1979 | Justice | 74/58 X |
| 4,274,296 | 6/1981 | Miller et al. | 74/459 X |
| 5,191,805 | 3/1993 | Parsons | 74/459 |

FOREIGN PATENT DOCUMENTS

1044 of 1906 United Kingdom.

*Primary Examiner*—Charles A. Marmor
*Assistant Examiner*—Troy Grabow
*Attorney, Agent, or Firm*—H. Gibner Lehmann; K. Gibner Lehmann

[57] ABSTRACT

A mechanical oscillator including a shaft having an endless groove in its periphery, a nut body carried by and slidable along the shaft at the location of the endless groove, and a roller pin carried by the nut body, having a nose portion extending into and engaging a wall of the endless groove and having a tail portion disposed deeply in the nut body. A plurality of anti-friction bearings is carried by the nut body, the bearings carrying the roller pin. The anti-friction bearings include both a ball bearing and a needle bearing, the ball bearing being disposed adjacent the nose portion of the roller pin, and the needle bearing being located adjacent the ball bearing and engaged with a tail portion of the roller pin. Multiple roller pins can be used, carried on two carrier strips respectively, which are axially displaced and disposed at opposite sides of the nut body. The carrier strips and associated roller pins can be removed as units, thereby simplifying replacement as required by damage or wear.

9 Claims, 4 Drawing Sheets

MECHANICAL OSCILLATOR

CROSS REFERENCES TO RELATED APPLICATIONS

The present application is a continuation of my application U.S. Ser. No. 08/333,735 filed Nov. 3, 1994, entitled MECHANICAL OSCILLATOR, and having common ownership with the present application, now U.S. Pat. No. 5,592,852 dated Jan. 14, 1997. Priority under 35 USC 120 is hereby claimed.

STATEMENT AS TO RIGHTS TO INVENTIONS MADE UNDER FEDERALLY-SPONSORED RESEARCH AND DEVELOPMENT

Research and development of the present invention and application have not been Federally-sponsored, and no rights are given under any Federal program.

BACKGROUND OF THE INVENTION

Field of the Invention

This invention relates generally to improvements in mechanical oscillators or traverse mechanisms, and more particularly to improvements in the reciprocator illustrated and described in U.S. Pat. No. 3,792,616 entitled RECIPROCATING DRIVE, having common ownership with the present application.

The entire disclosure of U.S. Pat. No. 3,792,616 is hereby specifically incorporated into the present application, by specific reference thereto.

DESCRIPTION OF THE RELATED ART INCLUDING INFORMATION DISCLOSED UNDER 37 CFR §§1.97–1.99

The following patents are hereby made of record, as being related to the field to which the present invention pertains:

U.S. Pat. Nos.:

| U.S. Pat. Nos.: | | |
|---|---|---|
| 3,296,880 | 3,308,674 | 3,766,788 |
| 3,766,800 | 3,779,094 | 4,008,625 |
| 4,022,076 | 4,031,765 | 4,198,872 |
| 4,199,999 | 4,343,200 | 5,191,805 |

British Patent No. 1044 dated Jan. 15, 1907
French Patent No. 526,586

U.S. Pat. No. 3,792,616 above identified discloses a mechanical oscillator having a turnable shaft containing two parallel tracks or grooves, and a nut body carrying radially-disposed rollers on bearings. Each roller has a nose which engages the walls of the grooves as the shaft is turned, such that the nut undergoes reciprocating movement as the shaft is driven. Centralizers in the form of needle bearings are provided at opposite ends of the nut body, to maintain the alignment between the axis of the latter and that of the shaft.

The patented construction has enjoyed a degree of commercial success, and has been found to operate satisfactorily for certain specific applications.

However at high speeds, problems are encountered with roller slippage and excessive wear, even with appropriate lubrication of the relatively moveable parts. In particular, with such arrangements the inertia of the nut body during reversal, must be overcome at each end of the reciprocating stroke, causing relatively large (though momentary) forces to be applied to the individual rollers and their respective bearings at the points of reversal.

In addition, and more serious is the problem of slippage of the individual rollers on the walls of the tracks as reversal is occurring. In particular, with the disclosed construction, both rollers tend to turn in one direction about their respective axes for one-half of the reciprocating cycle, and then, by virtue of their shift to engagement with the opposite faces or walls of the grooves, each roller is suddenly subjected to a force which tends to cause it to suddenly reverse its direction of turning.

As can be readily appreciated, in practice, sudden or instantaneous reversal of the direction of turning of the individual rollers does not readily occur. Instead, there arises some combination of sliding of the individual rollers against the opposing groove wall, followed by eventual reversal of the direction of rotation, assuming that the speeds involved are sufficiently slow to permit the inertia of the rollers to be overcome at all. As a consequence, excessive wear occurs, and the anti-friction characteristic of the oscillator, as intended by the provision of the anti-friction bearings for each roller, is seen to be largely lost, or at best, significantly diminished.

An early use of thread-engaging rollers in a helical-type screw is disclosed in British Patent No. 1044 issued in January, 1907, and French Patent No. 526,586 issued in October, 1921.

Refinements in the constructions noted in the previous paragraph were patented in 1967, appearing in U.S. Pat. Nos. 3,296,880 and 3,308,674. In these patents there is disclosed a number of anti-friction mechanical drive constructions involving Acme-type helical thread forms and nut structures comprising various type of anti-friction rollers, and including bearings for the rollers. The disclosed constructions have enjoyed considerable commercial success over the years.

Various improvements to these patented structures have been devised. In particular, in U.S. Pat. No. 3,766,788, rollers are housed in bushing assemblages which have outer cylindrical walls that are eccentric with respect to the respective roller housed therein. The arrangement is such that each bushing can be adjustably turned in its respective radial socket in the nut body, so as to effect a lateral shifting of the roller to accommodate slight variations in thread pitch which are encountered during normal manufacturing operations involved in fabrication of the screw.

Another arrangement is shown in U.S. Pat. No. 3,766,800, which features a nut/screw combination having anti-friction rollers, wherein the nut, in addition to the thread-engaging rollers, has conventional internal threads which are purposely made undersize, and which do not normally engage the screw threads unless an unusually high axial load is applied between the nut and screw. Under such high loads, the rollers become retracted to the extent that the fixed thread form of the nut engages the screw, thereby to alleviate excessive loading on the rollers, and to prevent a catastrophic failure of the nut/screw which otherwise might result.

Still other variations on the patented devices noted above are illustrated in U.S. Pat. Nos. 4,008,625; 4,198,872; 4,199,999; and 5,191,805. In Patent No. '625, two nut components or parts are cascaded along a screw, each component having a radial roller which is spring biased into engagement with a wall of the thread groove. A coil spring carried by one of the nut parts, in turn applies an additional spring bias to the nut components so as to cause the roller of one component to "hug" one wall of the thread groove, and the roller of the other component to "hug" the opposite wall of the groove, thereby to minimize backlash of the cascaded nut assembly.

Patent No. '872 discloses a modified anti-friction nut adapted for relatively light loads, and with a more conventional helical thread form. In place of anti-friction rollers, the disclosed construction utilizes balls as the thread-engaging elements. Slippage of the ball on the thread occurs as the screw is turned. Each ball is carried in a radially-extending socket carrying a bushing having a cup-shaped ball seat.

An improvement in the construction of Patent No. '872 above identified is shown in U.S. Pat. No. 4,199,999. This latter device incorporates a special cage and housing in order to hold captive a series of thread-engaging balls. The cage and housing telescope with one another, and the resultant structure was found to be more economical to manufacture than some of the prior anti-friction drives of the type utilizing balls as anti-friction elements.

A further simplified anti-friction drive for a screw having a modified Acme thread is illustrated in U.S. Pat. No. 5,191,805. A radial roller is provided on a nut body, supported on inner and outer ball bearings. The use of ball bearings has been found to be especially economical, since their cost is quite low, and they are readily available in the marketplace, at very competitive prices.

Modified structures employing anti-friction rollers are shown in U.S. Pat. No. 3,779,094, which utilizes a diamond-thread screw in place of a helical-thread type screw. Special roller cartridges are arranged to be slidable on the nut body, thereby permitting lateral shifting of selected rollers, which results in the capability of reversal of the nut at either one of the opposite ends of the screw thread, or at selected points along the screw, namely at the location of the groove intersections of the diamond thread.

Other anti-friction constructions illustrating the use of balls as thread-engaging elements are shown in U.S. Pat. Nos. 4,022,076 and 4,031,765. In patent '076, there is illustrated an anti-backlash mechanism to reduce looseness between a nut and screw. The second patent constitutes an improvement in U.S. Pat. No. 3,779,094, in that the use of rollers has been eliminated, and thread engaging balls employed to engage the screw, while still maintaining the capability of reversal of the nut at the ends of the screw thread.

Finally, U.S. Pat. No. 4,343,200 illustrates a reversing mechanism employing a diamond thread screw, and a special reversing collar that can be selectively applied to the diamond thread at various points therealong, so as to enable the direction of travel of the nut to be reversed at any one of a plurality of points along the thread. The collar in effect, provides a selectively installable and removable abutment or "reversing groove" at any one of a number of different points along the length of the screw.

In the case of the anti-friction drive constructions noted above and of the type which employ either a simple helical thread or a diamond thread, the problem of sudden reversal in the axial movement of a nut was not generally addressed. In particular, only the device of U.S. Pat. No. 3,792,616 experiences exactly two reversals in the axial direction of movement of the nut for each revolution of the screw. In all of the other patented devices discussed above, reversal occurs less frequently, and typically at relatively low speed of operation.

Thus, the problem of inertia of the nut body at the point of reversal is not disclosed. Also, none of the patents discloses the problem of inertia of a roller element giving rise to wear of either the roller or the thread.

As mentioned above, where high speed operation is required and where there arises the need to suddenly reverse the direction of rotation of the roller in order to minimize sliding contact between it and a thread groove wall, the matter of impulse-type torque or forces applied to the individual rollers must be addressed. Where a non-sliding contact cannot be realizeable for reasons of excess speed, or high load, there occurs excessive wear, which more often than not, proves to be intolerable; in addition, where sliding of a roller occurs, the resulting friction not only defeats the anti-friction characteristic of the mechanism, but in addition, creates heat.

As a consequence, there has arisen a need for a high-speed, relatively long-life oscillator mechanism which will resist wear and operate in a satisfactory manner over prolonged time periods. In addition, there has arisen a need for an oscillator construction which can be easily serviced, and where replacement of parts on a routine basis, somewhat analogous to periodic maintenance, can be realized.

SUMMARY OF THE INVENTION

Accordingly, it is one object of the present invention to provide a novel and improved heavy-duty automatic mechanical oscillator which is both simple in its structure, and especially reliable in operation over extended periods of use.

A related object of the invention is to provide an improved mechanical oscillator of the kind noted, which lends itself to periodic inspection and maintenance, with a minimum of downtime, and in a cost-effective manner.

Still another object of the invention is to provide an improved mechanical oscillator as above characterized, which utilizes simple anti-friction bearing assemblages which are readily available in the marketplace, and which can be obtained at especially low cost.

Yet another object of the invention is to provide an improved mechanical oscillator as set forth above, which has a significantly increased load capacity.

Still another object of the invention is to provide an improved mechanical oscillator as characterized above, wherein anti-friction rollers or spindles carried on a nut or follower body always move or turn unidirectionally for both forward and reverse senses of relative rotation between the shaft and nut or follower body, thereby reducing wear on the roller spindles and on the walls of the groove formation, by eliminating the necessity for the roller spindles to reverse direction suddenly at one end of a reciprocating stroke, as occasioned by an impulse-type force applied thereto.

A still further object of the invention is to provide an improved automatic mechanical oscillator as indicated above, wherein multiple sets of roller pins or spindles are utilized, one set functioning to drive the nut or follower portion of the oscillator in one axial direction, and the other set functioning to drive the nut or follower portion in the opposite direction, the rollers or spindles of each set having a sense of rotation which is identical to one another, and the rollers or spindles of each set turning in a direction which is opposite to that of the other set, in a clockwise/counterclockwise sense when viewed from the nose of the roller or spindle.

A still further object of the invention is to provide an improved mechanical oscillator of the kind indicated, which is especially adapted for relatively high-speed operation, and which is especially well suited to overcome the problems of inertia that are otherwise encountered in the case of a relatively high mass object being required to reverse its direction of movement in an impulse-type situation. The oscillator can thus operate reliably and without failure, and without experiencing excessive wear of the various components.

Yet another object of the invention is to provide an improved mechanical oscillator as above described, wherein a desirable balanced drive force is applied by the shaft to the nut body, by virtue of radially-extending rollers that are oppositely directed or oriented so as to minimize undesirable lateral forces between the shaft and nut body.

The above objects are accomplished by a mechanical oscillator comprising basically in combination a shaft having differently-oriented endless grooves in its periphery and a nut or follower body carried by and slidable along the shaft on the peripheral portion thereof which has the endless grooves; the nut body carries differently-oriented roller pins or spindles having nose portions extending into and engaging walls of the endless grooves and having tail portions disposed deeply in the nut body. Anti-friction bearings in the nut body carry the roller pins. These comprise ball bearings disposed adjacent the nose portions of the roller pins, and needle bearings located adjacent the ball bearings and engaged with tail portions of the roller pins. The different groove orientations maintain the noses of the roller pins constantly in engagement respectively with only single individual opposite sides of the respective grooves in which the pins travel.

The invention also provides an automatic mechanical oscillator comprising in combination a shaft, a follower body movable along the shaft, and automatic cooperable bi-directional coengaging drive means on the shaft and follower body, for effecting opposite oscillating movements of the body in response to continuous uni-directional turning of the shaft; the drive means also has automatically alternately drivingly operable portions, one portion being solely operable to shift the follower body in one given direction in response to turning of the shaft through a predetermined one half revolution, and the other portion being solely operable to shift the follower body in an opposite direction in response to turning of the shaft through a succeeding one half revolution.

The invention further provides an automatic mechanical oscillator comprising in combination a shaft, a follower body movable along the shaft, a first cooperable drive means on both the shaft and the follower body, operable solely for effecting movement of the follower body in a first axial direction in response to unidirectional turning of the shaft through a predetermined one-half revolution in one direction, and a second cooperable drive means on both the shaft and the follower body, the second drive means being separate and distinct from the first drive means and being operable solely for effecting opposite axial movement of the follower body in response to continued turning of the shaft in the one direction through a succeeding one half revolution.

The arrangement is such that an especially simple nut construction is still realizeable, utilizing readily available bearings which can be procured at especially low cost, and in relatively large quantities, all without sacrifice in operating reliability. In addition, periodic servicing and/or replacement is greatly facilitated, resulting in minimum down-time, and greatly reduced possibility of product failure.

Other features and advantages will hereinafter appear.

BRIEF DESCRIPTION OF THE DRAWINGS

In the drawings, illustrating a preferred embodiment of the invention.

DESCRIPTION OF THE PREFERRED EMBODIMENT

Figure 1:
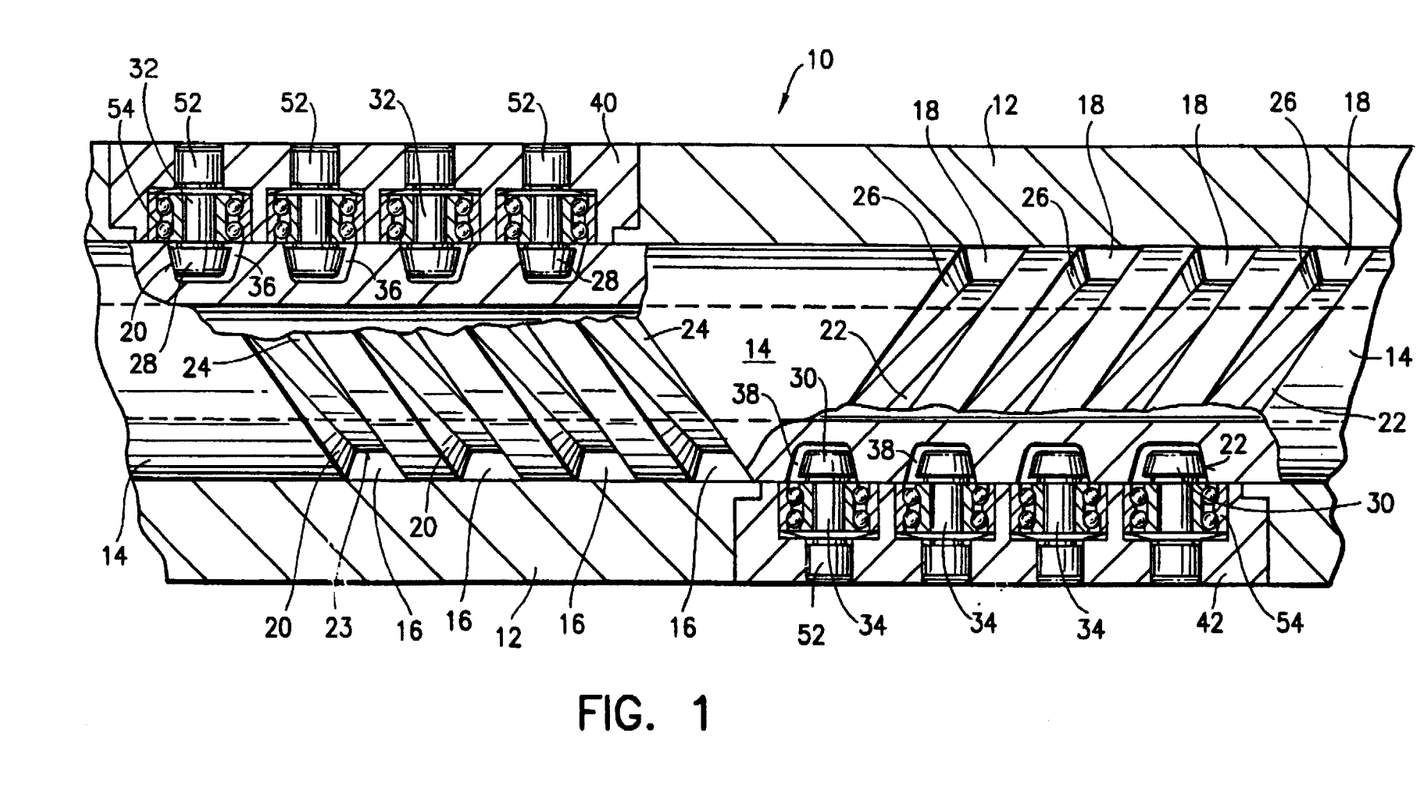
FIG. 1 is a fragmentary view, partly in side elevation and partly in axial section, of the improved mechanical oscillator of the present invention, particularly illustrating a nut or follower body having two cartridges or carrier strips, each in turn carrying four roller pins, the roller pins respectively engaging side wall portions of multiple paralleled endless grooves formed in a drive shaft associated with the nut.
Figure 2:
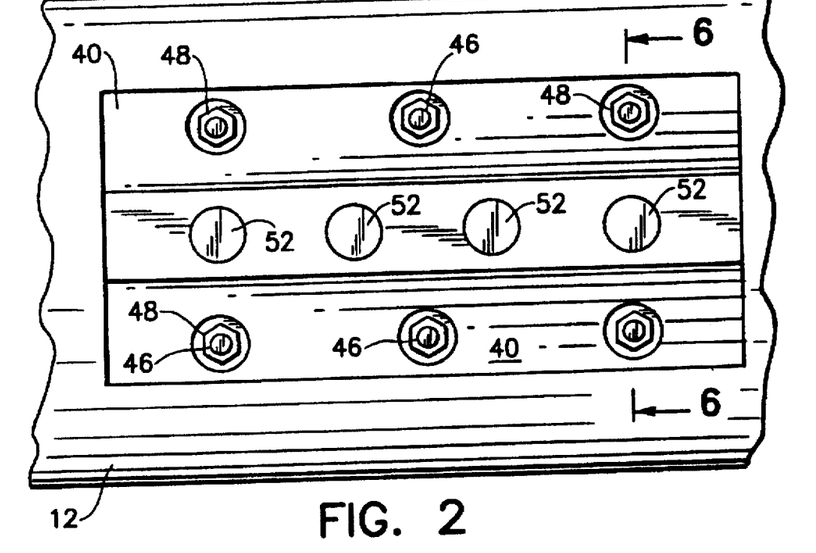
FIG. 2 is a fragmentary top plan view of the mechanical oscillator of FIG. 1.

Referring first to FIG. 1, the improved mechanical oscillator of the invention basically comprises a continuously turning rotatable shaft and a nut or follower thereon, which is slidably mounted and caused to reciprocate between given limits while the shaft continues to turn. Between the shaft and follower there is an automatic cooperable bi-directional co-engaging drive means having a special function to effect low-inertia load transfer oscillating movements to the nut follower in response to continuing uni-directional turning of the shaft. The drive means comprises turnable rotary drive members in the form of pins or spindles on the follower, engaged in grooves in the shaft, and is characterized by automatically alternating operable portions, one portion being solely operable to shift the follower body in one given direction in response to turning of the shaft through a predetermined one half revolution, and the other portion being solely operable to shift the follower body in an opposite direction in response to turning of the shaft through a succeeding one half revolution. The oscillator is generally designated by the numeral 10. It comprises a tubular nut body 12 which is carried by the specially machined shaft 14. The shaft 14 has two sets of differently, oppositely 180-degree oriented endless grooves 16 and 18, each set consisting of four individual grooves which are disposed one after another in parallelism. The grooves 16 and 18 have divergent, sloped side walls 20, 22 respectively which are hereinafter referred to as driving walls, and bottom walls 23. The walls 20, 22 are opposite to the companion, non-driving walls 24, 26 with which they respectively form the divergent configurations of the grooves 16, 18.

Each of the grooves 16, 18 is like a loop, as found in a box cam, being endless and complete in and of itself, as will now be understood. In the illustrated embodiment of the invention the endless grooves 16, 18 are generally in the nature of the endless grooves 14, 16 in U.S. Pat. No. 3,792,616 mentioned above. It will be noted that the grooves 16 slope oppositely or are skewed or opposed with respect to the grooves 18, and that the walls 20, 24 and 26, 22 which face each other are spaced apart an appreciable distance, thereby to accommodate the nose portions 28 and 30 respectively of sets of roller pins 32 and 34. The tail portions 31 of the pins 32 are disposed in the nut body 12.

The sets of roller pins 32, 34 are oppositely mounted or 180-degree oriented in the nut body 12 so as to engage with the oppositely facing portions or walls 20, 22 of the grooves 16, 18 and to be spaced from the bottom walls 23. It will be understood that by this arrangement the shaft 14 can be rotated with the grooves 16, 18 alternatingly driving the nut 12 first in one direction and then in the opposite direction.

In accordance with the invention the set of four roller pins 32 divides amongst themselves the load which results from reciprocating the nut body 12, as will be later explained. Similarly the set of roller pins 34 is arranged to divide the load amongst themselves in consequence of driving the nut body 12.

As will be explained further below, the set of roller pins 32 constituting one portion of the oscillator drive train drive the nut body 12 in one direction for ½ shaft revolution, and the set of roller pins 34 constituting another portion of the oscillator drive train drives the body 12 in the opposite direction for the next ½ revolution, this being made possible by the 180 degree groove and pin orientation and the clearance spaces 36 at the nose portions 28 of the roller pins 32, together with the clearance spaces 38 at the nose portions 30 of the roller pins 34.

As clearly shown in FIG. 1 the nose portions 28 of the roller pins 32 are all engaged with driving walls 20 of the grooves 16, whereas the nose portions 30 of the pins 34 are all drivingly engaged with walls 22 of the grooves 18. Such engagement is constant and remains in effect during continuous rotation of the shaft 14. It is the result of the proper placement of the roller pins 32 with respect to the roller pins 34.

By the use of multiple parallel endless grooves 16 and 18 together with the plurality of roller pins 32, 34 the load which is experienced by any roller pin is normally reduced to one-quarter of the existing total load which occurs when the nut body 12 is being reciprocated.

From the above it can be seen that the basic concept of the invention may be explained by considering the shaft 14 as a continuously unidirectionally turning driver, and the nut body 12 as a reciprocating follower, with the grooves 16, 18 and roller pins 32, 34 (which are actually rotary drive members) in the form of a drive train disposed between the shaft 14 and nut body 12. The direction of turning of the pins or rotary drive members 32, 34 never changes during the reciprocation of the follower or nut body 12 for a given direction of turning of the shaft 14.

The invention provides unique mounting means for the roller pins 32 and 34, in the form of replaceable carrier strips 40, 42. The strips 40, 42 are supported in the nut body 12 in 180-degree displaced rectangular recesses such as the recess 44 in FIG. 3. The carrier strips 40, 42 are secured by threaded studs 46 which are held by a force fit in the nut body 12 and which pass through suitable holes in the carrier strips and are provided with nuts 48.

Figure 3:
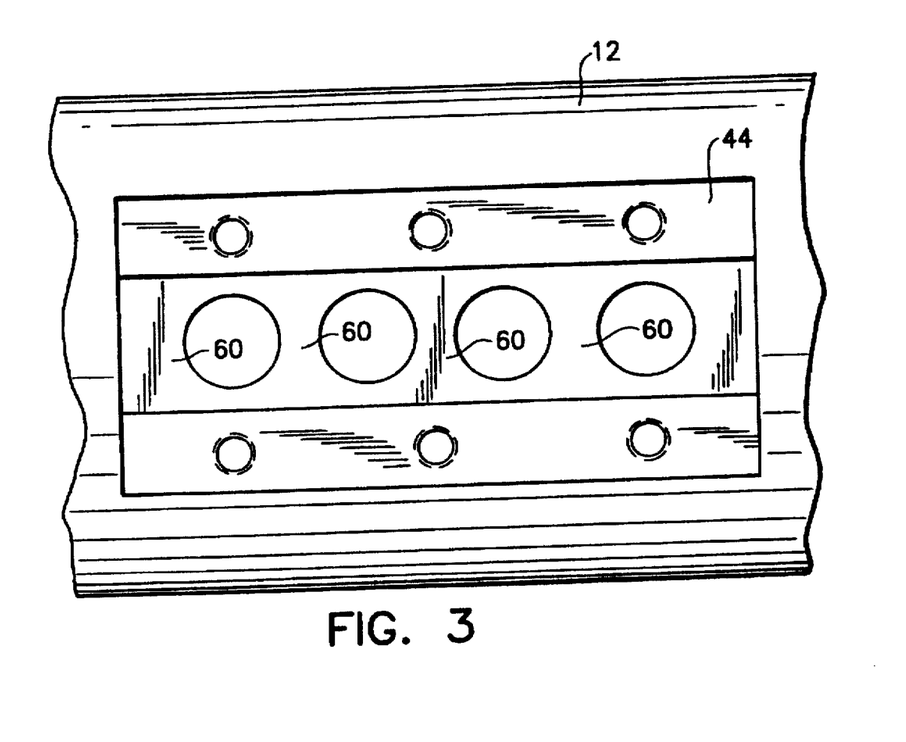
FIG. 3 is a top plan view of the nut body per se, with the carrier strip and rollers removed, and illustrating the recess which receives one of the carrier strips.

As shown, the nuts 48 are readily accessible from the exterior of the strip 40, to facilitate both initial installation of the strip and subsequent removal thereof. By such an arrangement the strip 40 and roller pins 32 carried thereby can be removed, and a substitute or new assembly installed, as desired. This replacement procedure involves simply removing the six nuts 48, lifting the carrier strip 40 out of the recess 44, installing the new carrier strip, and replacing the nuts 48, as can be readily understood.

As noted above, by the invention the recesses 44 are located on the nut body 12 so that the roller pins at the upper left of FIG. 1 respectively engage the left or driving faces 20 of the grooves 16, whereas the roller pins 34 at the lower right of the figure respectively engage the right or driving faces 22 of the grooves 18.

The invention further provides unique anti-friction mountings for the roller pins 32, 34 in the form of needle bearings 52 which carry the tail portions 31 of the pins, and double-row angular-contact ball bearings 54 which are constituted to carry composite loads and which are adjacent the nose portions 28, 30 of the roller pins.

Figure 6:
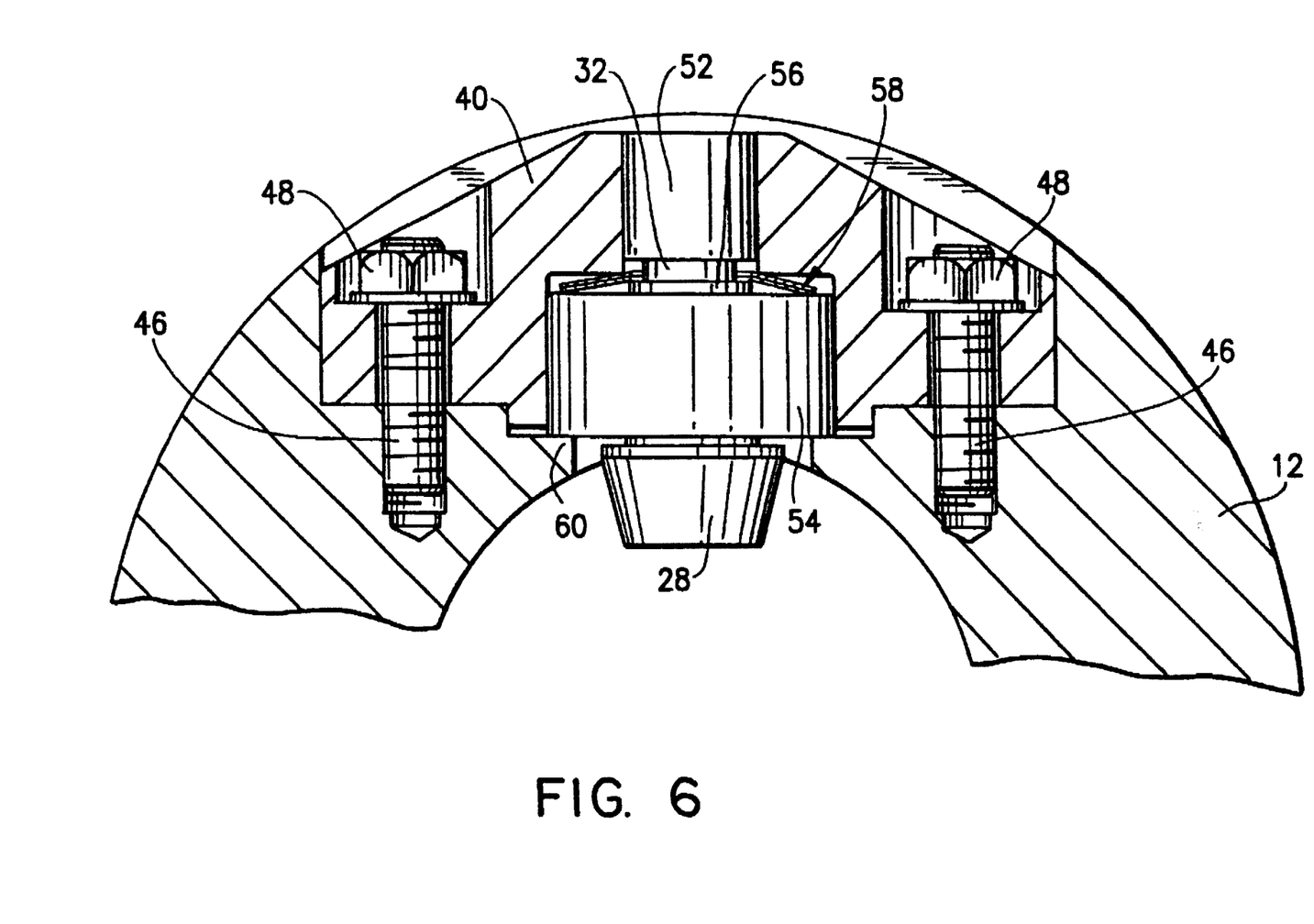
FIG. 6 is a section taken on the line 6—6 of FIG. 2, showing the nut or follower body with its bore, through which the drive shaft extends.

Referring to FIG. 6 it will be seen that the carrier strip 40 has stepped bores to accommodate the needle and ball bearing assemblages 52, 54. Roller pin 32 has an annular shoulder 56, and a spring bias is effected thereon by pairs of nested conical spring washers 58 as applied to the roller pins by virtue of the washers engaging the ball bearing assemblage 54 and the carrier strip 40. The washers 58 are compressed slightly due to engagement of wall portions 60 of the nut body 12 with end surfaces of the outer races of the ball bearing assemblages 54. The washers 58 constitute resilient means which bias the bearing 54 and its roller pin in radially inward directions, and thereby tend to equalize the load between the various roller pins. By such an arrangement, the spring washers 58 yield by amounts dictated by the radially-outwardly directed loads on each roller pin by the shaft 14, such yielding tending to reduce the load on any one roller pin which momentarily might experience an increase in load, and thus shifting the load to the other roller pins, and vice-versa.

By the above noted engagement of the wall portions 60 and bearings 54, the roller pins 32 are slightly retracted prior to their engagement with the shaft 14 which is to be inserted. This retraction of the roller pins 32 establishes a desired pre-alignment of the noses 28 along a single axial zone of alignment with the nut body.

Figures 4, 5, 7:
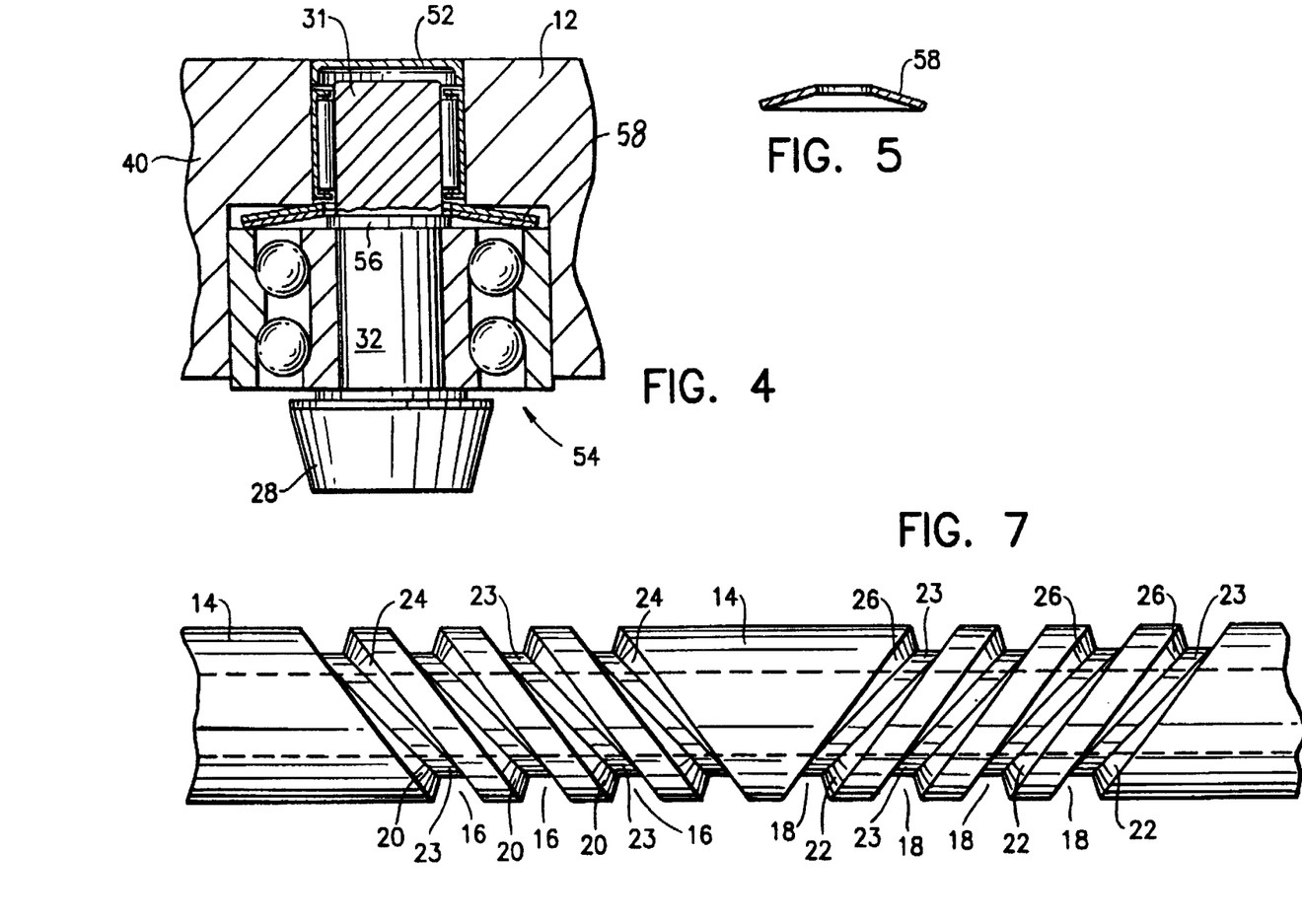
FIG. 4 is a fragmentary view, greatly enlarged, of one carrier strip and roller carried thereby, showing the anti-friction bearings associated therewith.
FIG. 5 is an axial section of a spring washer utilized in the carrier strip and roller of FIG. 4.
FIG. 7 is a top plan view of the shaft having the multiple endless groove formations, with which the follower or nut is utilized.

In FIGS. 4 and 6, two nested spring washers 58 are illustrated. This construction provides more stiffness and added resilience, for increased forward biasing of the roller pins as may be necessary for higher speed operation. However, a single spring washer may be utilized for certain applications.

It will now be understood that when the oscillator is completely assembled the engagement of the nose portions 28, 30 with the respective driving walls 20, 22 of the grooves 16, 18 will cause a slight compression of the washer or washers 58, so as to accommodate tolerances in the construction of the various components. Thus, the nose portions 28, 30 will be resiliently held in engagement with the driving walls of the respective grooves, as illustrated in FIG. 1.

In consequence of the above construction, turning of the shaft 14 in one direction will always result in a unidirectional turning of each roller pin 32, and each roller pin 34, respectively. No reversal of turning of an individual pin ever occurs during the reciprocation of the nut body 12 as it is driven by the unidirectionally turning shaft 14. Due to this feature of unidirectional rotation of a given roller pin for a given unidirectional sense of turning of the shaft 14, potential problems that would otherwise be encountered with attempts to suddenly reverse the direction of turning of a particular roller pin are completely eliminated. As a consequence, sliding of the roller pins on the walls of the grooves 16 or 18 is kept to a minimum, as is wear of both the roller pins and their associated groove walls. This feature is considered to be an important aspect of the present invention, and is believed to constitute a breakthrough in the field of traverse mechanisms or reciprocators.

Instead of the multiple or additional parallel endless grooves 16, shown here as four in number, a single endless loop-like groove 16 and a single roller pin 32 can be utilized to constitute the left portion of FIG. 1, this same being true of the right portion of FIG. 1 where a single groove 18 and roller pin 34 may be utilized. The loading of such components, of course, will not be divided as is the case when multiple grooves and roller pins are utilized in each set, involving additional components.

The use of needle bearings 52 as distinguished from ball bearings provides added stability and strength to the oscillator of the invention, and the combination of needle and ball bearing mountings is not only saving of space but results in additional ruggedness in operation.

Backlash and looseness of the nut body on the shaft is largely eliminated by virtue of the one group of roller pins' engagement with one face, namely the respective driving walls 20 of the grooves 16, and the other group of roller pins' engagement with the opposite or driving walls 22 of the grooves 18.

From the above it can be seen that I have provided a novel and improved mechanical oscillator which is both simple in its structure, and rugged and reliable over extended periods of use. As noted above, and in the preferred embodiment, each roller pin rotates in one direction only for a given sense of rotation of the shaft. This feature effectively eliminates troublesome inertial forces which would tend to resist reverse-movement of each roller pin, especially at high speeds.

The spring washers effectively maintain contact between the driving faces of the respective grooves and roller pins, thereby eliminating spaces therebetween. Also, a desirable balance in drive force is achieved by the opposite disposition of the sets of roller pins. As a consequence, the lateral force on the shaft as occasioned by one set of four rollers is largely balanced out or countered by a corresponding, oppositely-directed force on the shaft as applied by the remaining set of four rollers.

Surprisingly smooth, high-speed operation is thereby achievable, with the disclosed construction.

In addition, by virtue of the unidirectional turning of each roller pin, significantly reduced wear is encountered, resulting in reliable operation over extended periods of use.

The unique carrier strip construction facilitates replacement of the roller pins, merely by loosening of nuts, removal of the strip, and substitution of a new unit. Preferably the needle bearings are of a closed-end type, which seal the assemblies of roller pins and ball bearings from any debris at the exterior of the carrier strips.

The angular-contact (dual-row) ball bearings utilized in the device of the present invention have been especially selected to more effectively handle both the lateral and axial thrust experienced by the roller pins, as during high speed operation of the oscillator. Simpler, single ball bearings are believed to be incapable of withstanding these forces nearly as well as the angular-contact type. In the case of the needle bearings, the loads are considerably lighter, and almost entirely lateral in direction, since the roller pins are intended to slide freely in the respective needle bearings.

The disclosed, preferred embodiment involves roller pins and grooves which are displaced substantially 180 degrees circumferentially from one another (i.e. in FIG. 1, the roller pins 34 and grooves 18 are displaced circumferentially by an angle of essentially of 180 degrees from the roller pins 32 and grooves 16); however, as presently understood and as an alternative, the roller pins 34 and grooves 18 could be displaced circumferentially by either a greater or lesser angle from the 180 degree figure shown. There might result some degradation in operation as a consequence of the resulting dissymmetry brought about by such an alternate arrangement.

The disclosed oscillator is thus seen to represent a distinct advance and improvement in the field of mechanical oscillators.

Variations and modifications are possible without departing from the spirit of the invention.

Each and every one of the appended claims defines an aspect of the invention which is separate and distinct from all others, and accordingly it is intended that each claim be treated in this manner when examined in the light of the prior art devices in any determination of novelty or validity.

What is claimed is:

1. A mechanical oscillator comprising, in combination:
   a) a shaft having an endless groove in its periphery,
   b) a nut body carried by and slidable along said shaft on the peripheral portion thereof which has the endless groove,
   c) a roller pin carried by said nut body, having a nose portion extending into and engaging a wall of the said endless groove and having a tail portion disposed deeply in the nut body,
   d) anti-friction bearings carried by the nut body, said bearings carrying the said roller pin,
   e) said anti-friction bearings comprising a ball bearing disposed adjacent the nose portion of the roller pin, and a needle bearing located adjacent the ball bearing and engaged with a tail portion of the roller pin, and
   f) a carrier strip demountably secured to the nut body, on which the anti-friction bearings are mounted,
   g) said nut body having an exterior recess in which the carrier strip is mounted,
   h) said recess having a bottom wall with an opening to receive the roller pin, and a wall portion surrounding said opening, said wall portion engaging the outer race of the said ball bearing, and effecting a retraction of the ball bearing with respect to the carrier strip as the latter is seated in the recess of the nut body.

2. An automatic mechanical oscillator comprising, in combination:
   a) a shaft,
   b) a follower body movable along said shaft,
   c) automatic cooperable bi-directional co-engaging drive means on said shaft and follower body, for effecting opposite oscillating movements of the body in response to continuous unidirectional turning of the shaft,
   d) said drive means having two separate and distinct automatically alternatingly-operable driving portions, one portion being operable to solely drive the follower body in one given axial direction in response to turning of the shaft through a predetermined one half revolution, and the other portion being operable solely to drive the follower body in an axial opposite direction in response to turning of the shaft through a succeeding one half revolution,
   e) the automatically alternatingly-operable driving portions of said drive means comprising a drive train having a pair of turnable rotary drive members each of which rotates in solely a given predetermined single direction during operation of the oscillator.

3. An automatic mechanical oscillator as set forth in claim 2, wherein:

11 a) said rotary drive members comprise spindles which are turnably carried by the follower body, b) said shaft having a plurality of endless grooves in which portions of said spindles are received, and in which said spindle portions travel.

4. An automatic mechanical oscillator as set forth in claim 3, wherein the follower body has anti-friction bearings carrying said spindles.

5. An automatic mechanical oscillator comprising, in combination:

a) a shaft, b) a follower body movable along said shaft, c) a first cooperable drive means on both said shaft and said follower body, operable solely for effecting driving movement of the follower body in a first axial direction in response to unidirectional turning of the shaft through a predetermined one-half revolution in one direction, and d) a second cooperable drive means on both said shaft and said follower body, said second drive means being separate and distinct from said first drive means and being operable solely for effecting opposite-direction axial driving movement of the follower body in response to continued turning of the shaft in said one direction through a succeeding one half revolution, e) the first cooperable drive means comprising a turnable rotary drive member which rotates in solely a given predetermined single direction during operation of the oscillator, and f) the second cooperable drive means comprising a second turnable rotary drive member which also rotates in solely a given predetermined single direction during operation of the oscillator.

6. An automatic mechanical oscillator as set forth in claim 5, wherein:

a) said rotary drive members comprise spindles which are turnably carried by the follower body, b) said shaft having a plurality of endless grooves in which portions of said spindles are received, and in which said spindle portions travel.

7. An automatic mechanical oscillator as set forth in claim 6, wherein the follower body has anti-friction bearings carrying said spindles.

8. An automatic mechanical oscillator comprising, in combination:

a) a shaft, b) a follower body movable along said shaft, c) automatic cooperable bi-directional co-engaging drive means on said shaft and follower body, for effecting opposite oscillating movements of the body in response to continuous unidirectional turning of the shaft, d) said drive means having two separate and distinct automatically alternately drivingly operable portions, one portion being solely operable to shift the follower body in one given direction in response to turning of the

12 shaft through a predetermined one half revolution, and the other portion being solely operable to shift the follower body in an opposite direction in response to turning of the shaft through a succeeding one half revolution, e) the automatically alternately operable portions of said drive means comprising a drive train having a pair of turnable rotary drive members each of which rotates in solely a given predetermined single direction during operation of the oscillator, f) said rotary drive members comprising spindles which are turnably carried by the follower body, g) said shaft having a plurality of endless grooves in which portions of said spindles are received, and in which said spindle portions travel, h) said follower body having a bore through which the shaft passes, and i) said spindles projecting into said bore and being circumferentially oriented 180 degrees apart in said bore.

9. An automatic mechanical oscillator comprising, in combination:

a) a shaft, b) a follower body movable along said shaft, c) a first cooperable drive means on both said shaft and said follower body, operable solely for effecting movement of the follower body in a first axial direction in response to unidirectional turning of the shaft through a predetermined one-half revolution in one direction, and d) a second cooperable drive means on both said shaft and said follower body, said second drive means being separate and distinct from said first drive means and being operable solely for effecting opposite axial movement of the follower body in response to continued turning of the shaft in said one direction through a succeeding one half revolution, e) the first cooperable drive means comprising a turnable rotary drive member which rotates in solely a given predetermined single direction during operation of the oscillator, f) the second cooperable drive means comprising a second turnable rotary drive member which also rotates in solely a given predetermined single direction during operation of the oscillator, g) said rotary drive members comprising spindles which are turnably carried by the follower body, h) said shaft having a plurality of endless grooves in which portions of said spindles are received, and in which said spindle portions travel, i) the follower body having a bore through which the shaft passes, and j) said spindles projecting into said bore and being circumferentially oriented 180 degrees apart in said bore.

* * * * *